Figure 1:
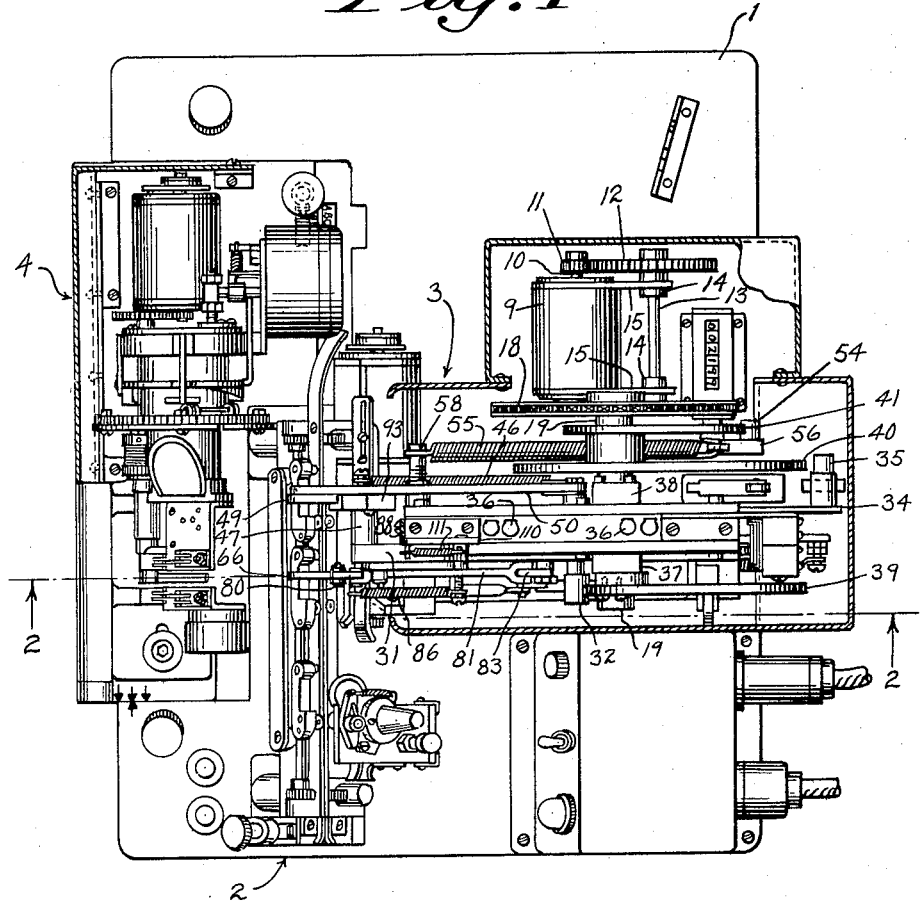

March 29, 1966   F. S. TOBEY   3,243,331
LABEL HANDLING APPARATUS
Original Filed Oct. 21, 1959   7 Sheets-Sheet 1

INVENTOR
FREDERIC S. TOBEY
BY
ATTORNEY

March 29, 1966  F. S. TOBEY  3,243,331
LABEL HANDLING APPARATUS
Original Filed Oct. 21, 1959  7 Sheets-Sheet 2

INVENTOR
FREDERIC S. TOBEY
BY Thomas O. Kloehn
ATTORNEY

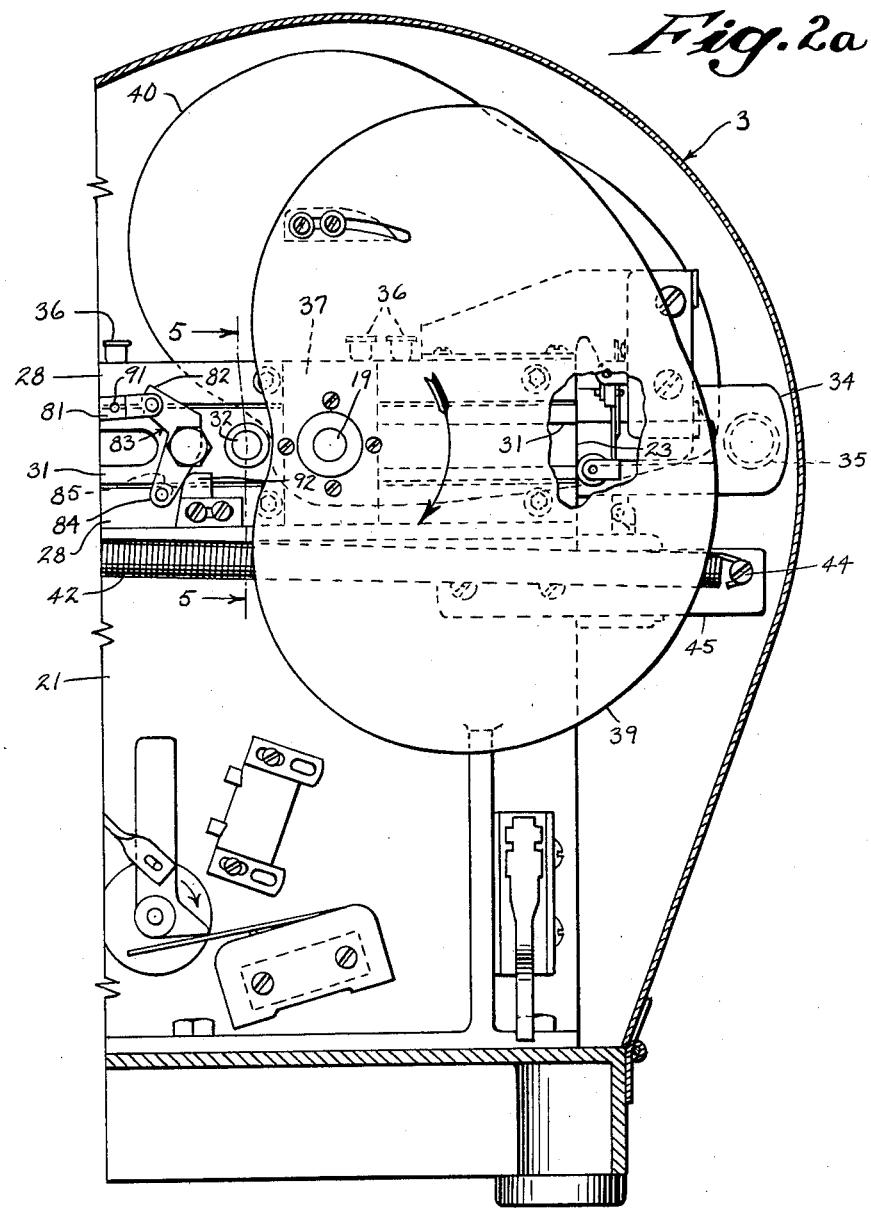

March 29, 1966        F. S. TOBEY        3,243,331
LABEL HANDLING APPARATUS
Original Filed Oct. 21, 1959        7 Sheets-Sheet 4

INVENTOR
FREDERIC S. TOBEY

ATTORNEY

March 29, 1966  F. S. TOBEY  3,243,331
LABEL HANDLING APPARATUS
Original Filed Oct. 21, 1959  7 Sheets-Sheet 5
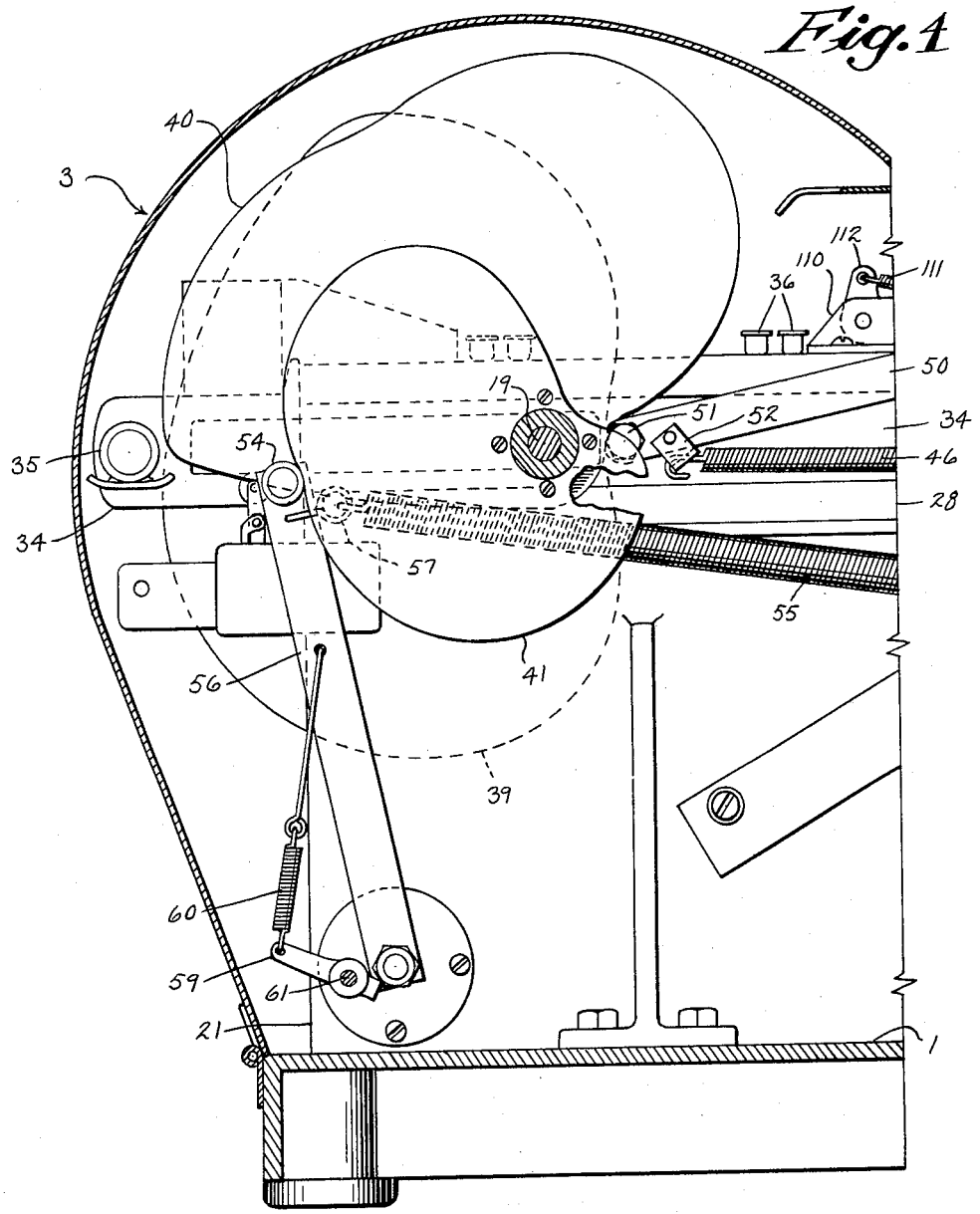
Fig. 1
INVENTOR
FREDERIC S. TOBEY
BY 
ATTORNEY March 29, 1966   F. S. TOBEY   3,243,331
LABEL HANDLING APPARATUS
Original Filed Oct. 21, 1959   7 Sheets-Sheet 6
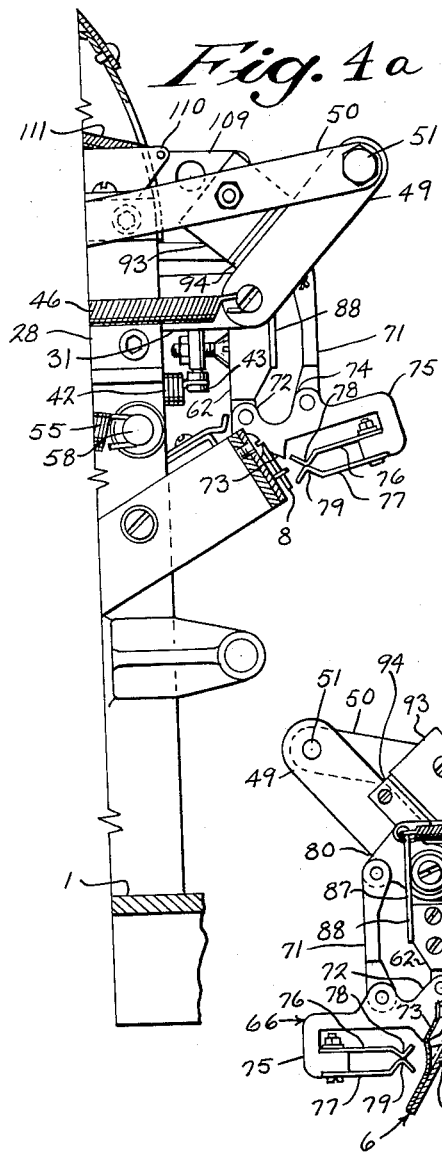
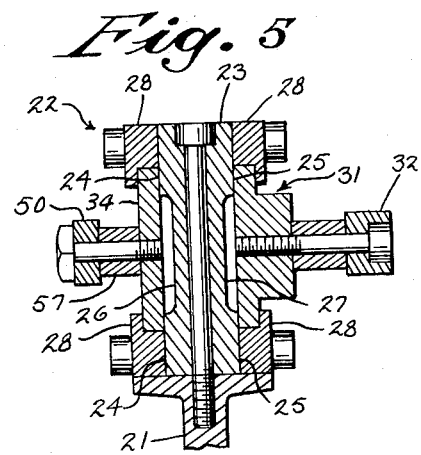
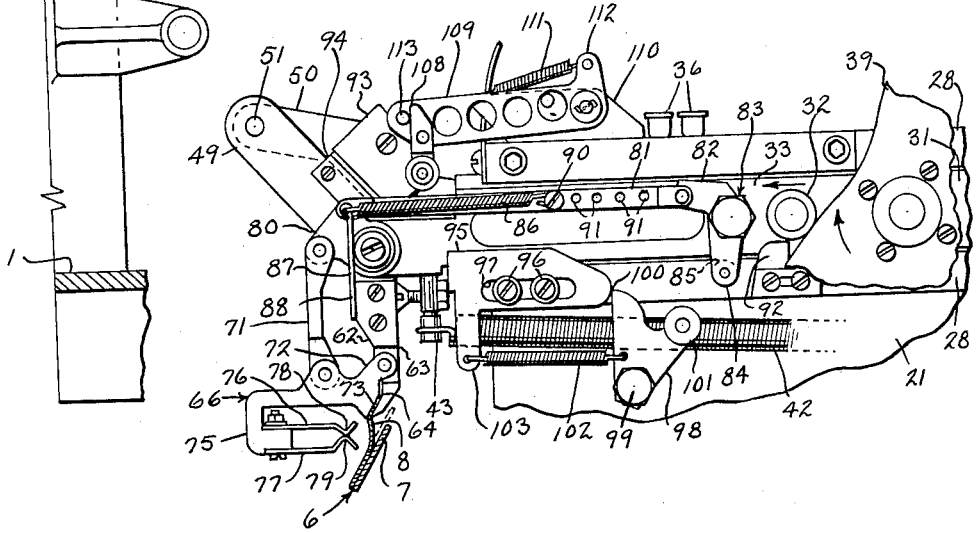
INVENTOR
FREDERIC S. TOBEY
BY Thomas O. Kloehn
ATTORNEY March 29, 1966  F. S. TOBEY  3,243,331
LABEL HANDLING APPARATUS
Original Filed Oct. 21, 1959  7 Sheets-Sheet 7
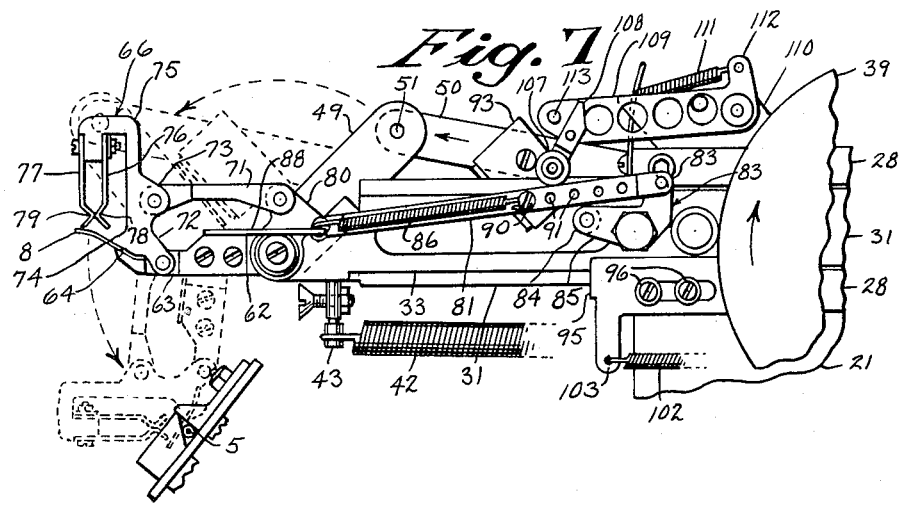
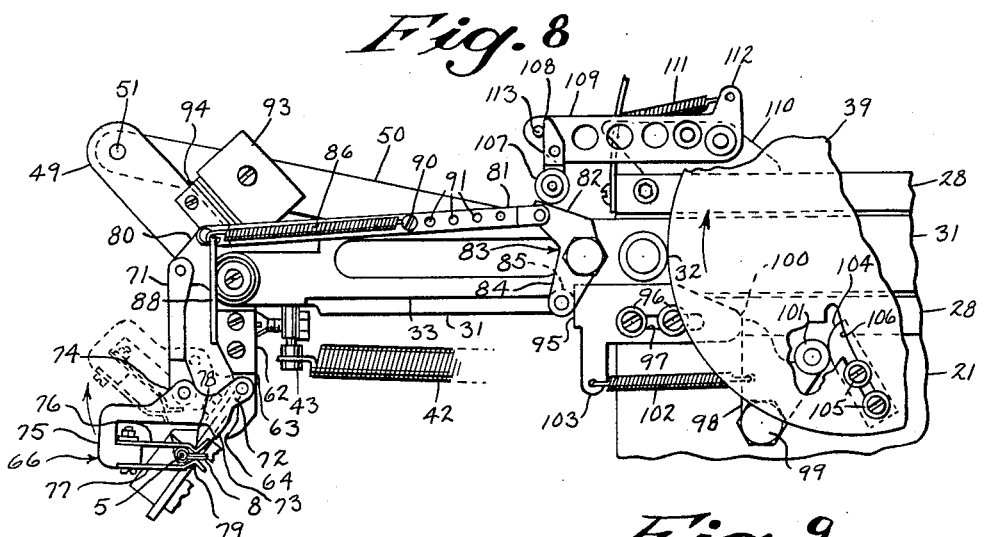
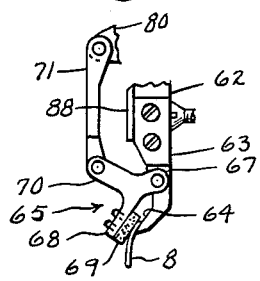
INVENTOR
FREDERIC S. TOBEY
BY Thomas O. Kloehn
ATTORNEY United States Patent Office 3,243,331
Patented Mar. 29, 1966

3,243,331
LABEL HANDLING APPARATUS
Frederic S. Tobey, Walpole, Mass., assignor to W. H. Brady Co., Milwaukee, Wis., a corporation of Wisconsin
Original application Oct. 21, 1959, Ser. No. 847,739, now Patent No. 3,192,093, dated June 29, 1965. Divided and this application Apr. 30, 1965, Ser. No. 452,081
7 Claims. (Cl. 156—477)

This is a division of application Serial No. 847,739, filed on October 21, 1959, now Patent No. 3,192,093 issued on June 29, 1965.

The present invention pertains to an automatic label handling apparatus for peeling labels from a backing, and presenting said labels for application onto an object to be labeled, with an alternative form for applying flag labels to cylindrical objects. More particularly, the invention resides in articulated clamping jaws pivotally suspended from a sliding boom so that said jaws may grasp a label, peel said label from a backing, transport said label to an object to be labeled and apply said label partially or completely to said object; and the invention also resides in a novel cam drive means for operating said jaws and arm.

Adhesive coated labels are commonly mounted on a release coated backing to form what is called a label dispenser to facilitate their manufacture and handling. Labels of the sort referred to are used a great deal in the electrical industries for labeling conductors and other electrical circuit elements, and, accordingly, the label dispenser must present the labels so that they may be conveniently manually removed one at a time by electricians and other technicians. These labels are intended to be applied around cylindrical objects, some of which are as small in diameter as a human hair and of very delicate structure. One such label dispenser is disclosed in Patent No. 2,434,545, issued to W. H. Brady, Jr., et al., on January 13, 1948. In that patent a backing card of stiff material is shown with pressure sensitive adhesive labels mounted across its release-coated surface, and the backing card is longitudinally scored so that successive strips of it may be torn away to expose successively portions of rows of labels.

However, when such labels are to be applied in mass quantities at high speed, a fully automatic device is needed to avoid prohibitive labor expenditure for a repetitive, low skill function. Such a device must be able to utilize the label dispensers intended for manual use and perform the otherwise manual functions of peeling the labels from their backing, transporting the labels to the object to be labeled and either presenting the labels in position to be wrapped around the object by another device, or directly applying the labels around the object. The present invention was created in response to that need, and it achieves the objectives with a rectilinear movement, a pivotal movement and a prehensile or grasping movement, all in parallel planes. The synchronized driving force for those movements is supplied through a balanced, double, radial or plate cam mechanism, utilizing mechanical and magnetic linkages, and having as a prime mover an electric motor of maximum starting torque and minimum inertia.

Hence, it is an object of the present invention to provide a high speed, fully automatic label handling apparatus.

It is another object of the present invention to provide an automatic label handling apparatus to peel labels from a backing and transport and apply them to an object to be labeled.

It is another object of the present invention to provide a fully automatic flag label applying apparatus.

It is another object of the present invention to provide a highly versatile automatic label handling apparatus that may readily be adapted for use with various different labels for application to a variety of objects.

It is another object of the present invention to provide an automatic label handling apparatus for removing labels from an automatically fed backing and placing the labels on an automatically presented object to be labeled.

It is another object of the present invention to provide a versatile, automatic label handling apparatus for use as a component in different types of automatic labeling machines.

It is another object of the present invention to provide an automatic label handling apparatus that is inherently safe to operate so as to present a minimum, if any, injury hazard to an operator.

The foregoing and other objects and advantages will appear from the following description in which the invention is set forth in such full, clear, concise and exact terms as to enable any person skilled in the art to make and use it. In the description and the accompanying drawings, which form a part of the disclosure, an embodiment is shown, setting forth the best mode contemplated by the inventor of carrying out this invention. However, this invention is not limited to that embodiment here described, but instead the subject matter of the invention is particularly pointed out and distinctly claimed in the claims appearing at the conclusion of this specification.

Figure 2:
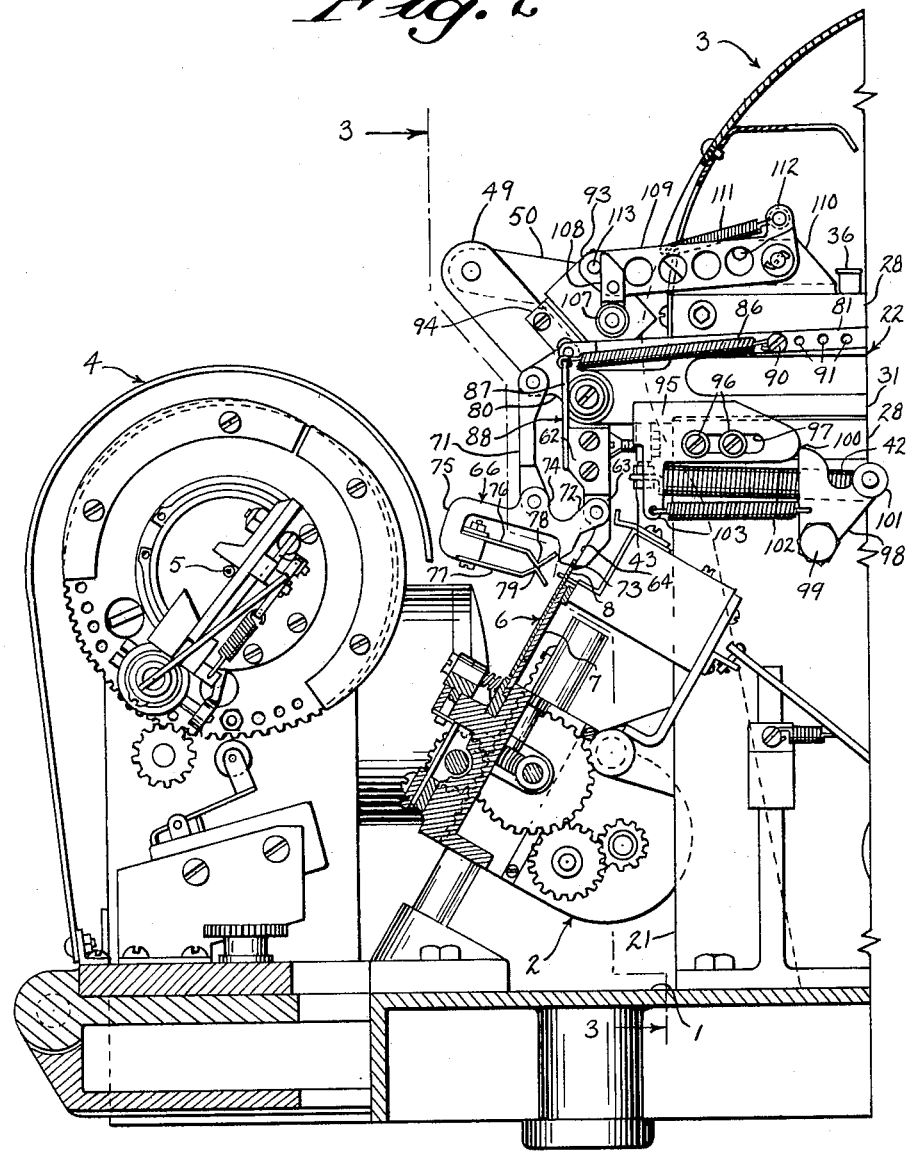
Figure 3:
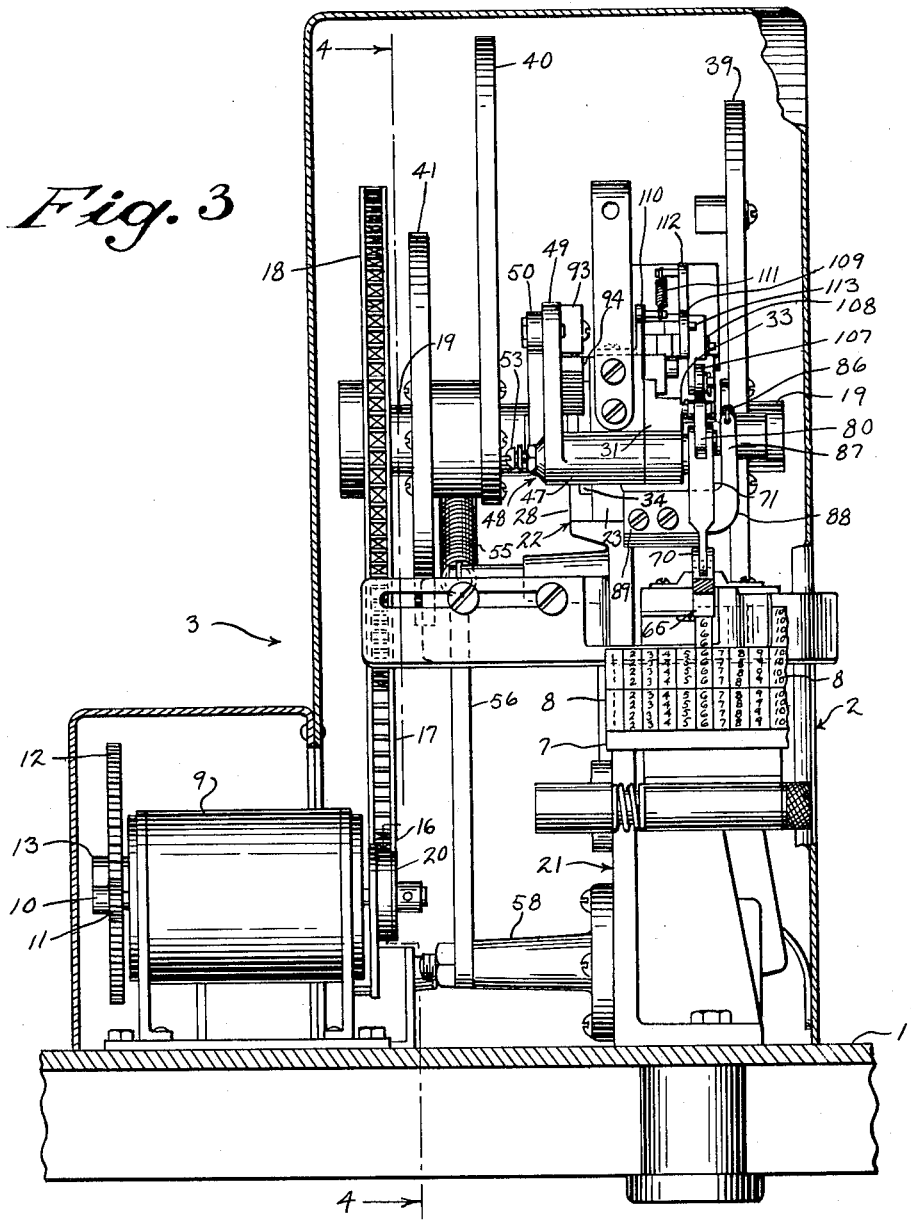

In the drawings:

FIG. 1 is a top plan view of an automatic labeling machine employing a preferred embodiment of the present invention, the top of the housing enclosing the mechanism being cut away to expose the working parts;

FIGS. 2 and 2a make up a side elevation in section of the labeling machine shown in FIG. 1, taken along the line 2—2 in FIG. 1, FIG. 3 is an elevation in section of the machine shown in FIGS. 1 and 2 taken along the line 3—3 in FIG. 2 to show the embodiment of the present invention employed in the machine, FIGS. 4 and 4a make up a side elevation of the embodiment of the present invention taken along the line 4—4 in FIG. 3, FIG. 5 is a view in section of the slide mechanism in the embodiment of the present invention taken along the line 5—5 in FIG. 2a, FIG. 6 is a side elevational view of the gripping mechanism, and portions of the slide mechanism and the cam mechanism of the embodiment of the present invention near the beginning of its operating cycle, FIG. 7 is a side elevational view of the gripping mechanism and portions of the slide and cam mechanisms of the embodiment of the present invention about midway through its operating cycle, FIG. 8 is a side elevational view of the gripping mechanism and portions of the slide and cam mechanisms of the embodiment of the present invention near the end of its operating cycle, FIG. 9 is a view in perspective of an object with a flag label applied on it by the embodiment of the present invention shown in the preceding drawings, and FIG. 10 is a side elevational view of gripping jaws of the embodiment of the present invention without a flagging extension.

To place the invention that is the subject of this specification in perspective, the description of the preferred embodiment of it may profitably be prefaced by a general description of the entire labeling machine of which it is a component. That labeling machine which is the subject of the above mentioned copending application is made up of a base 1 that supports a card feeding apparatus 2, a label handling apparatus 3 embodying the present invention, and a wrapping mechanism 4 that supports objects 5 to be labeled and may also automatically feed the objects 5 into position to be labeled. To operate the machine, label dispensers 6, such as those shown in the above mentioned Brady patent, are placed by the operator in the card feeding apparatus 2 which automatically moves the dispenser 6 in stepwise fashion transversely across the front of the label handling apparatus 3 while removing strips of backing material 7, so as to present exposed portions of labels 8 successively to the label handling apparatus 3. The operator may also supply the objects 5 to the wrapping mechanism 4, which presents the objects 5 tightly clamped in position to receive the labels 8, or the objects 5 may be automatically fed to the wrapping mechanism 4.

In order to appreciate more fully the description to follow, it is helpful first to dwell momentarily on the nature of the objects 5 that are to be labeled by this machine. It is contemplated that this machine will be used for labeling electrical circuit components of various sorts, such as wire conductors, resistors, capacitors, transistors, and the like. These objects 5 are more or less cylindrical and they are all quite small. Uninsulated lead wires or other conductors may be as fine as a hair. Objects 5 that are 1/16 inch in diameter must be considered commonplace. For objects 5 of such small diameter, a label 8 of appropriate size to be wrapped around the object 5 would be too small to be read with ease, and hence such labels 8 are flagged as is shown in FIG. 9. With larger objects 5 it is often desirable to use larger labels 8 that can be wrapped about the object 5 by the wrapping mechanism 4.

Against that background, the specific embodiment of the invention shown in the drawing may be considered. The motive source for the entire label handling mechanism is an electric motor 9, which is mounted on the base 1 so that its motor shaft 10 projects toward the top of the plan view of FIG. 1 and to the left in the elevation of FIG. 3. A pinion 11 on the end of the motor shaft 10 drives a spur gear 12 that is fastened on an end of a drive shaft 13 that is rotatably mounted parallel to the motor 9 in bearings 14, which are supported by end plates 15 fastened to and extending laterally from the ends of the motor 9. The opposite end of the drive shaft 13 mounts a sprocket wheel 16 that is connected through a sprocket chain 17 to drive another sprocket wheel 18 on an end of a cam shaft 19.

The characteristics of the motive source 9 employed in this embodiment to drive the label handling mechanism add a noteworthy functional result, and deserve discussion. The motor 9 is a reversible, servo-type induction motor designed for operation on two phase current, but as used in this label handling apparatus 3 it is powered by single-phase current fed to its windings through capacitor circuits so that the current in its two windings will be out of phase. The motor 9 is notably unusual in its capacity to produce maximum torque at zero speed, the reverse being true of most motors. Another extraordinary characteristic of the motor 9 is the very small size and weight of its rotor as compared to those in other motors of comparable size and operating specifications, and this feature minimizes the inertia of the motor 9. A spring biased disc brake 20 is mounted on the opposite end of the motor shaft 10 from the pinion 11 to provide a constant load on the motor 9. The sum of these characteristics along with the brake 20 provides a motive source 9 that for all practical purposes is able to start and stop instantaneously. This operation of the motive source 9 not only greatly enhances the accuracy and precision of the label handling apparatus 3, but it renders the apparatus 3 much more safe to operate, particularly in situations where the operator is required to perform one or more portions of the labeling function manually.

Continuing with the description of the label handling mechanism—which for convenience is nominally distinguished from the apparatus 3 in that the latter includes the motive source 9 with its associated electrical circuitry and brake 20—the chassis or primary supporting means is a pedestal 21. The pedestal 21 is a vertically mounted aluminum casting that stands on a horizontally extended foot portion which is bolted to the base 1, and that has a horizontal cross member or web on its top edge. The pedestal 21 also has vertical stabilizing webs projecting laterally from one side and tapering upward from the top of the horizontal foot portion, so that it provides a solid, rigid, though light weight, support for the rest of the mechanism.

Mounted on top of the horizontal top web of the pedestal 21 is a slide mechanism 22, which can be seen in cross section in FIG. 5. The central element of the slide mechanism 22 is a central fixed frame member 23 that is bolted to stand on edge on the pedestal 21, and that has slide surfaces 24 and 25 interrupted by central longitudinal recessed surfaces 26 and 27 on each lateral surface and a hole (not shown) through the center for the cam shaft 19. Square grooved guide strips 28 are bolted along the top and bottom edges of the slide surfaces 24 and 25 on each side of the frame member 23 to define slideways respectively on the sides of the frame member 23. A sliding boom 31, which is longitudinally slotted to accommodate the cam shaft 19, is mounted for sliding motion in the slideway on the right hand side of the central frame 23 in FIG. 5, and it has a cam roller 32, to receive forward sliding impetus, mounted on its narrow body portion 33, which projects laterally from the slideway. On the opposite side of the central frame 23, an elongated, rectangular slide block 34, which is similarly longitudinally slotted, is mounted for reciprocating sliding movement in the slideway, and it has a laterally projecting cam roller 35 (not visible in FIG. 5, but see FIGS. 1 and 4) near its back end to receive backward sliding impetus. Four oiler plugs 36 are mounted on top of the sliding mechanism 22 to lubricate it.

The chief function of the sliding boom 31 is to serve as means for imparting rectilinear, horizontal movement to the label 8. The chief function of the slide block 34 is to provide means synchronized with the motion of the sliding boom 31 for lifting the label 8 over the object 5 and lowering into position for application on the object 5.

The cam shaft 19 is rotatably mounted through the slot in the slide block 34, the hole in the central frame 23 and the slot in the arm 31 in bearings 37 and 38, which are bolted to the guide strips 28 on each side of the slide mechanism 22 to bridge over the slide block 34 and the boom 31 respectively. This permits the cam shaft 19 to be approximately centered on sliding boom 31 and slide block 34 without interfering with the reciprocating motion of those two sliding members.

Two radial operating cams 39 and 40 and one radial balancing cam 41 are mounted on the cam shaft 19, to provide, along with spring returns, a synchronized drive means for the slide mechanism 22. The boom operating cam 39 is mounted on the same side of the slide mechanism 22 as the sliding boom 31 and as it rotates it engages the cam roller 32 on the boom 31 from behind to drive the boom 31 forward. The slide block operating cam 40 is mounted on the same side of the sliding mechanism 22 as the slide block 34, and as it rotates it engages the front of the cam roller 35, which is on the back end of the elongated slide block 34, to drive the slide block 34 rearward. In summary, as the cam shaft 19 rotates in the clockwise direction as seen from the arrow in FIG. 2a, the arm 31 and the slide block 34 will be driven in relatively opposite directions by the operating cams 39 and 40, during certain portions of each cycle.

The action of the operating cams 39 and 40 and the cam rollers 32 and 35 in this preferred embodiment is a nonpositive cam action in that the cams 39 and 40 move the boom cam roller 32 and the slide block roller 35 in one direction only, and a spring return is provided to move the cam rollers 32 and 35 back in the opposite direction. A sliding boom return spring 42 has one end hooked about a pin 43 projecting downward near the front of the sliding boom 31, and its other end is anchored on a screw 44 which projects laterally from a rear extension 45 of the pedestal 21, and therefore it urges the sliding boom 31 rearwardly.

The spring return for the slide block 34 and its cam roller 35 is provided by a return spring 46 that is connected, through intermediate means, between a point approximately in the middle of the slide block 34 and the front end of the arm 31. The intermediate means include a shaft 47 of a clamping jaw elevator crank 48 which extends horizontally across the front of the slide mechanism 22, which is journaled through the front of the boom 31 at one end, and which has a handle 49 projecting radially upward at its other end approximately in front of the slide block 34. A connecting rod 50 is pivotally fastened at one end to the top of the crank handle 49 and is pivotally fastened at its other end to a pin 51 projecting laterally from the slide block 34 about midway between its ends. The return spring 46 for the slide block 34 is hooked at one end to an eye 52 suspended from the rod 50 just in front of the pin 51, and the other end of the spring 46 is hooked around a screw 53 that extends axially from the adjacent end of the crank shaft 47.

The balancing cam 41 is mounted on the cam shaft 19 between the slide block operating cam 40 and the sprocket wheel 18 to compensate for the imbalance and variations of torque requirements to the motor 9 from the two operating cams 39 and 40. To effect the desired balanced result, the balancing cam 41 is loaded by a cam roller 54 that is spring biased forwardly against the back of the balancing cam 41 by an extension spring 55. The cam roller 54 is mounted on the top end of a follower arm 56, the lower end of which is pivotally mounted to the pedestal 21. The extension spring 55 is hooked to an eye 57 mounted on the follower arm 56 just below the cam roller 54, and the spring 55 extends forward to have its opposite end anchored on a pin 58 that projects laterally from the pedestal 21 near its front vertical edge. An actuator 59 for a counter (not shown) is connected through a spring 60 to the follower arm 56 to pivot a counter shaft 61 on which it is fastened, when the follower arm 56 is moved by the rotating balancing cam 41.

A prehensile clamping assembly for grasping the labels 8 and applying them to the article 5 is centered about the clamping jaw elevator crank 48, which was mentioned above in connection with the spring return for the slide block 34. The elevator crank 48 has a lever 62 projecting radially downward from its shaft 47 at the end of the shaft opposite from the handle 49, and at an obtuse radial angle to the handle 49. The crank lever 62 is normally vertically suspended below the front end of the sliding boom 31. A stationary label clamping jaw 63 is screw-mounted to a lateral surface of the crank lever 62 to extend downwardly from the end of the crank lever 62 and to pivot about the axis of the crank 48 with the lever 62. At the lower end of the stationary clamping jaw 63 there is a forward facing label clamping surface 64.

Articulated with the stationary jaw 63 is a movable jaw 65 or 66, two forms of which are shown in the drawings. FIGS. 3 and 10 show the simpler movable jaw 65 of the two, which is Y-shaped and has a stem 67 hinge-jointed to the stationary jaw 63 just above its clamping surface 64. A lower branch 68 of the movable jaw 65 extends downward opposite the clamping surface 64 of the stationary jaw 63 and a resilient rubber or plastic clamping pad 69 is mounted on the end of the lower branch 67 facing the stationary clamping surface 64. Both the lower branch 68 and the clamping pad 69 extend well beyond the end of the stationary clamping surface 64 when the clamping pad 69 approaches clamping engagement with the stationary clamping surface 64. An upper branch 70 of the Y-shaped movable jaw 65 is pivotally connected to a lower end of a jaw control link 71, which by raising and lowering can pivot the jaw 65 about its hinge joint on the stationary jaw 63 to open and close the jaws, viz., move the clamping pad 69 toward or away from the stationary clamping surface 64.

The other form of movable paw 66, which is shown in FIGS. 1, 2, 4a, 6, 7 and 8, is adapted for fastening flag labels 8 to objects 5 as is shown in FIG. 9. The flagging movable jaw 66 may be visualized as a V-shaped member having a back branch 72 hinge jointed at its top to the stationary jaw 63 just above the stationary clamping surface 64 with a movable clamping surface 73 at its bottom facing the stationary clamping surface 63, and having a front branch 74 that is pivotally suspended at its top from the bottom of the link 71. A top end of a C-shaped flagging arm 75 is contiguous with and extends forwardly from the side of the front branch of the V-shaped member, and upper and lower resilient flagging blades 76 and 77 are mounted on the top and bottom sides of the lower end of the flagging arm 75 to project rearwardly. The resilient flagging blades 76 and 77 are crimped near their rearward ends into converging V-shaped configurations, the apexes 78 and 79 of which are in mutual engagement, and the flaring rearward sides of which provide surfaces that can be forced against the object 5 to wedge the apexes 78 and 79 apart.

The movable jaw 65/66 is connected through the control link 71 to a clamping actuating means including a strut member 80 that is rotatably mounted at its foot end to the front end of the sliding boom 31 concentrically with the shaft 47 of the elevator crank 48. The head of the strut 80 is pivotally attached on its front end to the top of the control link 71 and on its back end to the front of a rearwardly extending connector bar 81, the rearwardly end of which is forked for pivotal attachment to an end of a lever 82 of a clamping crank 83. The clamping crank 83 is pivotally mounted to, but spaced from the lateral surface of the body portion 33 of the sliding boom 31, and it has a handle lever 84 extending downward from the pivotal mounting with a roller 85 mounted on the inward facing surface of the end of the handle lever 84. Hence, by pivoting the clamping crank 84 about its mounting, the strut 80 is pivoted about its mounting by its connection to the clamping crank 84 through the connector bar 81. When the strut 80 pivots, it raises and lowers the link 71 which opens and closes the movable jaw 65 or 66 with respect to the stationary jaw 63.

The clamping force of the jaws 65 or 66 against 63 is controlled by a clamping tension spring 86. The forward end of the clamping spring 86 is hooked through an eye in the top of an upstanding member 87 of an L-shaped plate 88, the horizontal member 89 is bolted across the front of the crank lever 62 of the clamping jaw elevator crank 48. The other end of the clamping spring 86 is hooked about a pin 90 that is mounted through one of a row of mounting holes 91 through the connector bar 81. The tension of the clamping spring 86 will urge the connector bar 81 forward, thus urging the movable jaw 65 or 66 toward clamping engagement with the clamping surface 64 of the stationary jaw 63. The tension of the clamping spring 86 can be adjusted by moving the pin 90 to a different mounting hole 91, increasing the tension by moving the pin 90 back and decreasing it by moving the pin 90 forward.

The clamping jaws 63 and 65 or 66 are held open when they are in the normal or rest, rearmost position by a stop abutment 92. The stop abutment 92 is bolted to the lower guide strip 28 and projects upward to engage and pivot forwardly the handle lever 84 of the clamping crank 83, thus retracting the crank lever 82 and the connector bar 81 to raise the jaw control link 71 and open the jaws. When the sliding boom 31 is moved forward, the clamping crank 83 is released from the stop abutment 92 so that the crank lever 82 can pivot forwardly under the force of the clamping spring 86 closing the clamping jaws 65/66 and 63.

The clamping jaws 63 and 66 must be elevated to lift the label 8 over the object 5 as the arm 31 moves forward on its delivery stroke. The clamping jaws 63 and 66 are elevated by pivoting the clamping jaw elevator crank 48 about its axis through its shaft 47. During the delivery stroke, the elevating crank 48 is pivoted by the relatively rearward movement of the sliding block 34 pulling back on the connecting rod 50 that connects the sliding block 34 to the crank handle 49 of the elevator crank 48. In this connection the novel magnetic link used to stabilize the crank handle 49 and connecting rod 50 in the normal position should be described. A ferrite magnet 93 is mounted on the inside lateral surface of the connecting rod 50, placing it above the crank handle 49 which is also connected to the rod 50 on its inside lateral surface. Since both the crank 48 and the rod 50 are constructed of cast aluminum, a magnetic soft iron shoe 94 is mounted on the top surface of the crank handle 49 beneath the magnet 93 to be attracted to and held by the magnet 93. The magnetic force is strong enough to hold the crank handle 49 and the connecting rod 50 in their normal position except when the slide block 34 is driven relatively rearwardly pulling with it the rod 50 and the sliding boom 31 is driven forward pulling with it the crank 48 and its handle 49.

During the return stroke of the sliding boom 31, the clamping crank 83 pivots on its mounting sufficiently to elevate the movable jaw 65/66 so that it will clear the object 5, the shorter stationary jaw 63 being above the object 5 at all times. A novel cam actuated, self-returning movable abutment assembly pivots the clamping crank 83 to perform its jaw-lifting function. This assembly is made up a horizontal sliding abutment 95 slidably mounted on two screws 96 that extend through an elongated slot 97 parallel to its bottom edge and are secured near the front end of the lower guide strip 28 of the slideway for the sliding arm 31. To the rear of the sliding abutment 95, a wedge-shaped cam follower 98 is pivotally mounted at its apex on a pin 99 that is secured in and projects laterally from the pedestal 21. The forward top corner 100 of the cam follower 98 engages the lower back end of the sliding abutment 95 and a cam roller 101 is mounted to project outwardly from the rearward top corner of the cam follower 98. An extension return spring 102 is connected at its forward end to an eye 103 projecting downward from the front end of the sliding abutment 95, and its other end is connected through a hole in the cam follower 98 about midway between its apex and its forward top corner 100. An adjustable, auxiliary radial cam surface 104 is mounted on screws 105 through a slot 106 in the arm operating cam 39 to project inward from the inner lateral surface of the arm operating cam 31. The cam follower 98 is positioned so that the auxiliary cam 104 will engage the cam roller 101 on its top rear corner, pivoting the top of the cam follower 98 forward. The pivoting cam follower 98 drives the sliding abutment 95 forward to a position where its upper front surface engages the roller 85 on the end of the handle lever 84 of the clamping crank 83 on the rearward return of the sliding boom 31. As the roller 85 moves backward over the sliding abutment 95 it rises upward, pivoting the clamping crank 83 to pull the connector bar 81 rearward thus pivoting the strut 80 to elevate the jaw 65/66.

The simultaneous forward rectilinear movement of the sliding abutment 95 and the forward pivotal movement of the cam follower 98 extends the return spring 102, since its point of attachment to the cam follower 98 does not travel as far forward as the eye 103 that is suspended from the front of the abutment 95. Hence, when the auxiliary cam 104 passes the cam roller 101, releasing the cam follower 98, the spring contracts, pulling the sliding abutment 95 rearward and restoring the cam follower 98 to its normal, more rearwardly pivoted position.

When the simple Y-shaped movable jaw 65 is used and the label 8 is to be wrapped about the object 5 by the wrapper mechanism 4, it is desirable to press the label 8 on the object 5 with force in addition to that of the clamping spring 86, after the jaws 65 and 63 release the label 8, to apply the label 8 to the object 5 securely. The portion of the resilient clamping pad 69 extending beyond the stationary clamping surface 64 is provided for the purpose of pressing the label 8 against the object 5. The additional force is provided by a roller 107 that rides along and bears down upon the top of the connector bar 81. The roller is mounted on the bottom of a short leg 108 that is pivotally mounted on the forward end of what will be called a pressing arm 109. The arm 109 is mounted near its back end for limitable pivotable movement on a vertical bracket 110 that is secured to the top of the slide mechanism 22. A comparatively strong extension spring 111 is hooked to the top of a lever 112 projecting vertically upward from the back end of the pressing lever 109, and it extends forward under tension to where it is anchored in a hole near the front end of the bracket 110 so as to urge the front end of the pressing arm 109 downward. The front end of the pressing lever 109 has a stop pin 113 projecting laterally to limit the pivotal movement of the leg 108 supporting roller 107.

OPERATION

For the purposes of the present application it is unnecessary to describe the manner in which the label dispenser 6 and the labels 8 on it are presented to the label handling mechanism 3. The operation of the card feeding mechanism 2, which forms a part of the automatic labeling machine that is shown in the drawings, is fully described in the above mentioned copending application, and reference may be had to it for a description of how it operates. For the present purposes it is to be noted that the dispenser 6 with its labels on it is moved across the front of the label handling apparatus 3 at right angles to the sliding boom 31. The dispenser 6 stands on edge and tilted rearwardly to be at a slight angle from the vertical. The scored strips of the backing 7 are torn away to the rear by the card feeding mechanism 2 to present exposed top portions of a horizontal row of labels 8 between the jaws 65/66 and 63 of the label handling apparatus. When the jaws 65/66 and 63 grasp a label 8 and the sliding boom 31 carries it forward, the exposed portion of the label 8, pulled forward, forms an acute angle with the portion remaining on the backing 7. Thus, as the arm 31 continues forward, the label 8 is peeled from the backing 7 in much the same manner as a user of the dispenser would remove a label 8 manually.

To begin with, the dispenser 6 is in the position shown in FIGS. 2 and 3, but the present invention may be used in conjunction with many devices or it may be manually fed. A portion of the label 8 is exposed between the stationary clamping surface 64 and the moving clamping surface 73 of the stationary and movable jaws 63 and 66 respectively. The boom operating cam 39 and the block operating cam 40 are in the position shown in FIGS. 2a and 4 respectively, and the sliding boom 31 is retracted to its rearmost position and held there by the return spring 42. The elevator crank 48 is rotated into a position where the crank handle 49 is canted forward and the crank lever 62 extends vertically downward with the stationary clamping jaw 63 fastened to extend downward from it. The label clamping jaws 63 and 66 are held part way open by the adjustable stop member 90 that bears against the handle 84 of the clamping crank 83 to pull the connector bar 81 rearward, and the connector bar in turn pulls the strut member 80 upward pulling the link 71 and the movable jaw 66 upward along with it. In this normal, initial position, the cam follower 32 on the sliding boom 31 is spaced about 1/16 of a inch in front of the radial surface of the boom operating cam 39 to prevent a spurious movement of the boom operating cam 39 from changing the condition of the mechanism. The sliding boom 31 is held in this position by a stop screw (not shown) which is screwed into its threaded hole in front of the stationary member 23 of the sliding mechanism 22 so as to project horizontally forward and abut the back of the crank shaft 47.

When the motor 9 is energized, it accelerates to operating speed almost instantaneously transmitting its driving motion to the cam shaft 19 through the nylon pinion 11 on the motor shaft 10 to the spur gear 12 on the drive shaft 13 and thence to the sprocket 16, the sprocket chain 17 to the sprocket 18 on the crank shaft 19. The rotation of the cam shaft 19 will cause the cams 39, 40 and 41 to rotate in a clockwise direction as shown in FIG. 2a or in a counterclockwise direction as shown in FIG. 4. The boom operating cam 39 almost instantly engages the cam roller 32 on the sliding boom 31, forcing both of them forwardly. The initial rotation of the sliding block operating cam 40 does not engage the cam roller 35, and therefore the sliding block 34 is permitted initially to move forward with the sliding boom 31.

The initial forward movement of the sliding boom 31 disengages the roller 85 on the handle 84 of the clamping crank 83, permitting the clamping crank 83 to pivot so as to allow the connecting bar 81 to move forwardly under the force of the clamping spring 86. The forward movement of the clamping bar 81 pivots the strut 80 and the connecting link 71 downward, and this in turn pivots the movable jaw 66 downward about its hinge joint on the stationary jaw 63 so as to close the movable clamping surface 73 towards the stationary clamping surface 64 until it tightly clamps the label 8 between them.

With the jaws clamped together, the sliding boom 31 continues on its forward movement under impetus of the boom operating cam 39 and against the force of its return spring 42. After about 30° of rotation the cam roller 35 on the back of the sliding block 34 is engaged by a radially expanded portion of the block operating cam 40, driving the slide block 34 rearward while the sliding boom 31 continues its forward motion. The effect of this counter motion of the sliding block 34 to the sliding boom 31 is shown in FIG. 7. The sliding block 34 pulls its connecting rod 50 rearward breaking the magnetic link between the ferrite magnet 93 and the magnet shoe 94 on the crank handle 49, tilting the crank handle 49 rearward. This rearward pivoting of the crank handle 49, of course, pivots the entire jaw elevator crank 48, rotating the crank lever 62 from its normally vertically downward position forwardly and upwardly into a horizontal position. This action lifts the jaws 63 and 66 with the label 8 clamped tightly between them well above the object 5. When the sliding boom 31 completes its forward motion carrying the label 8 forwardly beyond the object 5, the slide block operating cam 40 is shaped to release the cam roller 35 and permit the slide block 34 to move forwardly again under the force of the extended return spring 42. The forward movement of the slide block 34 moves the connecting rod 50 forwardly tilting the elevator crank 48 back into its normal position so that the label 8 hangs directly in front of the object 5. At this point the shape of the boom operating cam 39 permits the boom 31 to retract slightly backward and then it holds the boom 31 in its slightly retracted position for approximately 30° of cam rotation. The position of the boom 31 in this slightly retracted condition is shown in FIG. 8.

The force of the sliding boom return spring 42 pulling backward on the sliding boom 31 is sufficient to overcome the relatively weak clamping spring 86 so that the engagement of the movable jaws 65/66 with the object 5 is sufficient to open the jaws releasing the label 8. If, as is shown in FIG. 8, the flagging movable jaw 66 is utilized, the slight backward movement of the sliding boom 31 causes the resilient flagging blades 76 and 77 to press the label 8 around the object 5 and to press the flag ends of the label 8 together on the backward facing surface of the object 5.

While the sliding boom 31 is held stationary in the position slightly retracted from its forwardmost position the auxiliary cam surface 104 on the inside of the boom operating cam 39 moves into engagement with the cam roller 101 on the upper rear corner of the cam follower 98. The auxiliary cam 104 moves to pivot the cam follower 98 forward, which slides the sliding abutment 95 into engagement with the roller 85 at the bottom end of the handle 84 of the clamping crank 83.

When the boom operating cam 39 rotates to permit the sliding boom 31 to continue its backward movement under force of its return spring 42, the sliding abutment 95 in its forwardly advanced position drives the roller 85 on the handle 84 of the clamping crank forward and upward, pivoting the clamping crank so as to hold a connecting bar 81 rearward and this in turn pivots the movable jaw 66 forwardly and upwardly. The forward and upward movement of the movable jaw 66 pulls the flagging blade away from the label 8 on the object 5 and lifts the flagging blade upward so that the entire movable jaw 66 clears above the object 5 while it continues its backward movement with the sliding boom 31. Simultaneously, the block operating cam 40 permits the sliding block 34 to move to its normal position under the impetus of the connecting rod 50 which is connected to the sliding boom 31 through the jaw elevator crank 48.

By the time the sliding boom 31 has returned to its normal rearwardly retracted position, the auxiliary cam 104 has released the cam follower 98 permitting the cam follower 98 and the sliding abutment 95 to be drawn together and retracted to their normal positions by the contraction of their return spring 102. To accomplish all of these movements the cam shaft 19 has rotated through one complete cycle. The label handling apparatus 3 is now ready to pick off another label 8 and apply it to an object 5 in the next cycle of the cam shaft 19.

If the simpler movable jaw 65 without the flagging arm 75 on it were used, the dwell time of the arm 31 in its position slightly retracted from its forwardmost position would serve to securely attach the label 8 to the object 5. As the sliding beam 31 retracts slightly from its forwardmost position, the portion of the label clamping pad 69 which extends beneath the end of the stationary label clamping surface 64 presses the label 8 against the object 5. This force on the clamping pad 69 opens the jaws 65 and 63 to release the label 8. Just after the jaws open the lever 82 of the clamping crank 83 engages the roller 107 of the pressing arm 109. The comparatively strong pressing spring 111, pulling against the vertical lever 112 which projects upwardly back of the pressing arm 109, forces the roller 107 downward, thus forcing the connector bar 81 in a forward direction to pivot the strut 80 and the link 71 downward. Hence, the pressing arm 109 forces the movable clamping pad 69 against the label 8 which rests upon the object 5. Due to the resilient characteristic of the pressing pad 69, it deforms to conform the label 8 about a portion of the curved surface of the object 5. Since the sliding boom 31 holds this position for approximately 30° of cam rotation, the label 8 is forced against the object 5 for the necessary dwell time to make it adhere firmly to the surface of the object 5 so that it will hold its position until the wrapping mechanism 4 can wrap the label 8 around the object 5, after the sliding boom 31 has retracted to its normal position.

The label handling apparatus 3 can be made to operate continuously as may be desired when flagging labels are being applied or intermittently as may be more desirable where the wrapping mechanism 4 is employed. In the embodiment shown with the automatic labeling machine illustrated in FIG. 1, the label handling apparatus 3, which is referred to in the copending application as a pick-off mechanism, is electrically interlocked with the card feeding mechanism 2 and the wrapping mechanism 4 so as to be electrically synchronized in its operation with the other two mechanisms. However, that is not essential to the present invention but is merely one advantageous possibility. A mechanical synchronization could be used, or the various components could be manually controlled.

It will be clear to one skilled in the art that a positive cam action could be utilized in lieu of the spring return or nonpositive cam action shown in this embodiment, but the nonpositive action utilized here provides a margin of safety which might not be present with a positive cam action device. The combination of the characteristics of the motor 9, the balanced operation achieved through the balancing cam 41 with its spring loaded follower 54–56, and the spring return utilized with the radial cam shown produces an apparatus 3 that cannot cause injury to the operator, even if the operator gets his hands in the way of the rapidly moving slide mechanism 22 or clamping jaw mechanism shown here. The gentleness of this rapidly operating apparatus also provides advantages in its ability to apply very tiny labels on very delicate components, and in protecting the machine itself from injury should the label handling apparatus as a result of faulty operation be improperly synchronized with the other apparatus so as to strike other portions of a labeling machine.

The preferred embodiment described above achieves all of the advantages which have been set forth here by virtue of its participation in the present invention. However, that embodiment is not to be confused with the invention itself which is set forth in the following claims.

I claim:

1. In an automatic label handling apparatus, the combination comprising:
   a pair of radial cams mounted in spaced relationship on a driven cam shaft;
   a slide mechanism mounted between said cams, having a sliding boom and a slide block mounted for reciprocating movement, said sliding boom having a cam follower engaging one of said cams to be driven forwardly by said cam and a spring return means, said slide block having a cam follower engaging the other of said cams to be driven relatively rearwardly by said other cam and a spring return;
   a pair of articulated clamping jaws pivotally suspended from a forward end of said sliding boom;
   means connecting said clamping jaws to said slide block to pivot said clamping jaws upward when said slide block moves rearwardly;
   and a clamping crank pivotally mounted on said sliding arm to abut a fixed stop member when said sliding arm is rearward, having a link extension connected to one of said clamping jaws and a spring connection to another of said clamping jaws urging said jaws together, said crank being pivoted by said spring to close said jaws when said sliding arm moves forwardly.

2. In an automatic label handling mechanism, the combination comprising:
   a sliding boom mounted for horizontal reciprocating movement, having a cam follower projecting from a lateral surface to receive impetus for said reciprocating movement and having a spring return;
   a set of clamping jaws pivotally suspended from a front end of said boom to be raised and lowered in a plane parallel to said plane of said movement of said arm;
   and a slide block mounted for reciprocating movement parallel to said boom and having a cam follower projecting from a lateral surface to receive impetus for said movement, having a spring return connected to said boom, and being connected to pivot said clamping jaws.

3. In a label handling apparatus, the combination comprising:
   a drive means including a driven cam shaft, and a first cam and a second cam mounted in spaced relationship on said cam shaft;
   a slide mechanism mounted between said first and second cams and having parallel slideways adjacent each of said cams and having a sliding boom mounted for reciprocating movement in one of said slideways and adapted to be moved by said first cam, and a slide block mounted for reciprocating movement in said other slideway and adapted to be moved by said second cam;
   a pair of articulated clamping jaws pivotally suspended from said sliding boom and being adapted for grasping and releasing movement relative to one another;
   and means connecting said sliding block to said clamping jaws to pivot said clamping jaws relative to said boom.

4. In a label handling apparatus, the combination comprising:
   a sliding boom mounted for reciprocating rectilinear movement;
   drive means adapted to impart reciprocating movement to said sliding boom;
   prehensile clamping jaws mounted on said sliding boom for alternately grasping and releasing action and adapted for synchronized displacement normal to said reciprocating movement of said boom;
   and clamping actuating means mounted on said boom and synchronized with said reciprocating movement of said boom to actuate said jaws to grasp a label at location in said reciprocating movement and to release said label at another location.

5. In a label handling apparatus, the combination comprising:
   a slide mechanism including a sliding boom and a slide block mounted for reciprocating movement in parallel slideways;
   drive means adapted to impart independent synchronized reciprocating motion to said sliding boom and said slide block;
   prehensile clamping jaws pivotally mounted on said sliding boom for displacement normal to said sliding motion of said boom and connected to be pivoted by said sliding movement of said slide block, said clamping jaws being hinge jointed together for relative grasping and releasing movement;
   and clamping actuating means mounted on said boom to actuate said grasping and releasing movement of said clamping jaws.

6. In a label handling apparatus, the combination comprising:
   a sliding boom mounted for reciprocating movement;
   drive means adapted to impart reciprocating movement to said sliding boom;
   prehensile clamping jaws mounted on said sliding boom and including a stationary jaw having a stationary clamping surface, a movable jaw hinge mounted to said stationary jaw adjacent said stationary clamping surface and having a movable clamping surface facing said stationary clamping surface, said jaws being spring biased to urge said clamping surface into engagement;
   a clamping crank pivotally mounted on said sliding boom having a lever linked to said movable jaw and a handle adapted to pivot said crank;
   and an abutment disposed adjacent to and independently of said sliding boom to engage said crank handle on said boom as said boom moves to pivot said crank causing said lever to move said movable jaw to disengage said clamping surface.

7. A label handling apparatus for peeling adhesive coated labels from a dispenser backing and applying said labels to an object to be labeled, comprising the combination of
- prehensile clamping jaws joined together by a hinge joint and adapted for relative motion about said joint to grasp an exposed portion of an adhesive coated label;
- a rotatable crank means supporting said jaws and adapted to raise and lower said jaws;
- a sliding boom mounted for substantially horizontal reciprocating movement and supporting said crank means from its forward end;
- and synchronized drive means connected to said jaws, said crank means and said boom to cause said jaws to grasp said label, said boom to move said jaws forward peeling said label from a backing, said crank means to rotate raising said jaws over an object to be labeled as said jaws move forward and lowering said label in front of said object, and causing said boom to move said label back to apply said label onto said object.

References Cited by the Examiner
UNITED STATES PATENTS 2,814,269  11/1957  Stahr _____ 156—572 X EARL M. BERGERT, *Primary Examiner.*

T. R. SAVOIE, *Assistant Examiner.*